United States Patent
Rifkin et al.

(10) Patent No.: US 10,091,317 B2
(45) Date of Patent: Oct. 2, 2018

(54) PROXIMITY-BASED CONTENT SHARING SCHEME

(71) Applicant: Aircam Inc., Santa Monica, CA (US)

(72) Inventors: Evan Rifkin, Pacific Palisades, CA (US); Ryan Rifkin, Los Angeles, CA (US); Alex Pronin, Calabasas, CA (US); Steve Lackenby, Topanga, CA (US)

(73) Assignee: Aircam Inc., Santa Monica, CA (US)

( * ) Notice: Subject to any disclaimer, the term of this patent is extended or adjusted under 35 U.S.C. 154(b) by 0 days.

(21) Appl. No.: 15/069,884

(22) Filed: Mar. 14, 2016

(65) Prior Publication Data

US 2017/0013076 A1    Jan. 12, 2017

Related U.S. Application Data

(60) Provisional application No. 62/133,221, filed on Mar. 13, 2015.

(51) Int. Cl.
*H04L 29/08* (2006.01)
*H04W 4/06* (2009.01)
*H04W 4/02* (2018.01)

(52) U.S. Cl.
CPC ............ *H04L 67/26* (2013.01); *H04W 4/023* (2013.01); *H04W 4/06* (2013.01); *H04W 4/21* (2018.02); *H04W 76/14* (2018.02)

(58) Field of Classification Search
CPC ........ H04L 67/26; H04W 4/06; H04W 4/023; H04W 4/21; H04W 76/14
See application file for complete search history.

(56) References Cited

U.S. PATENT DOCUMENTS

| 7,366,523 | B2 | 4/2008 | Viikari et al. | |
|---|---|---|---|---|
| 2003/0004916 | A1 | 1/2003 | Lewis | |
| 2007/0155307 | A1* | 7/2007 | Ng | H04H 20/61 455/3.01 |
| 2008/0062940 | A1* | 3/2008 | Othmer | H04W 4/02 370/338 |

(Continued)

FOREIGN PATENT DOCUMENTS

WO    2012153986 A2    11/2012

OTHER PUBLICATIONS

Lautamo, Molly, "Gluon: A photo-sharing app based on where you go, not who you know", website article posted Jun. 23, 2016, http://www.santacruztechbeat.com/2016/06/23/gluon-photo-sharing-app/, website last accessed Sep. 7, 2017, pp. 1-5.

*Primary Examiner* — Phong La
(74) *Attorney, Agent, or Firm* — SoCal IP Law Group LLP; Steven C. Sereboff

(57) ABSTRACT

A method and apparatus for proximity-based content sharing on wireless devices is presented in which a first device having a wireless communication region surrounding the device detects other wireless devices within the region. Communication connections are formed between the wireless devices. In response to a user action data is pushed from the wireless device to other wireless devices in the region. Communication connections can also be formed between devices in the region and devices outside the region and data may be pushed to the devices outside the region. Users can block other devices either within the region or outside the region so that they do not receive pushed data.

14 Claims, 13 Drawing Sheets

(56) References Cited

U.S. PATENT DOCUMENTS

| | | | |
|---|---|---|---|
| 2009/0054092 A1* | 2/2009 | Stonefield | G06Q 30/0601 455/466 |
| 2011/0066691 A1* | 3/2011 | Jideani | G06Q 30/02 709/206 |
| 2011/0279269 A1* | 11/2011 | Gerber | G06F 1/14 340/540 |
| 2013/0109412 A1* | 5/2013 | Nguyen | G06Q 30/0207 455/456.3 |
| 2013/0111520 A1* | 5/2013 | Lo | H04L 67/306 725/35 |
| 2013/0217332 A1* | 8/2013 | Altman | H04H 60/90 455/41.2 |
| 2013/0331127 A1* | 12/2013 | Sabatelli | H04W 4/021 455/456.3 |
| 2014/0018105 A1 | 1/2014 | O'Neil et al. | |
| 2014/0207889 A1* | 7/2014 | King | G06Q 10/107 709/206 |
| 2014/0213227 A1* | 7/2014 | Rao | H04W 4/206 455/414.3 |
| 2015/0002271 A1* | 1/2015 | Lee | G01S 5/0221 340/10.1 |
| 2015/0058409 A1* | 2/2015 | Wang | H04L 67/06 709/203 |
| 2015/0065172 A1 | 3/2015 | Do et al. | |
| 2015/0189535 A1* | 7/2015 | Bekiares | H04W 28/0226 370/230 |
| 2015/0262195 A1* | 9/2015 | Bergdale | G06Q 20/0457 705/5 |
| 2015/0281878 A1* | 10/2015 | Roundtree | H04W 4/008 455/41.2 |
| 2015/0288760 A1 | 10/2015 | Thomas | |
| 2015/0356121 A1 | 12/2015 | Schmelzer | |
| 2016/0012465 A1* | 1/2016 | Sharp | G06Q 20/18 705/14.17 |
| 2016/0065626 A1* | 3/2016 | Jain | G06F 17/30873 709/205 |

\* cited by examiner

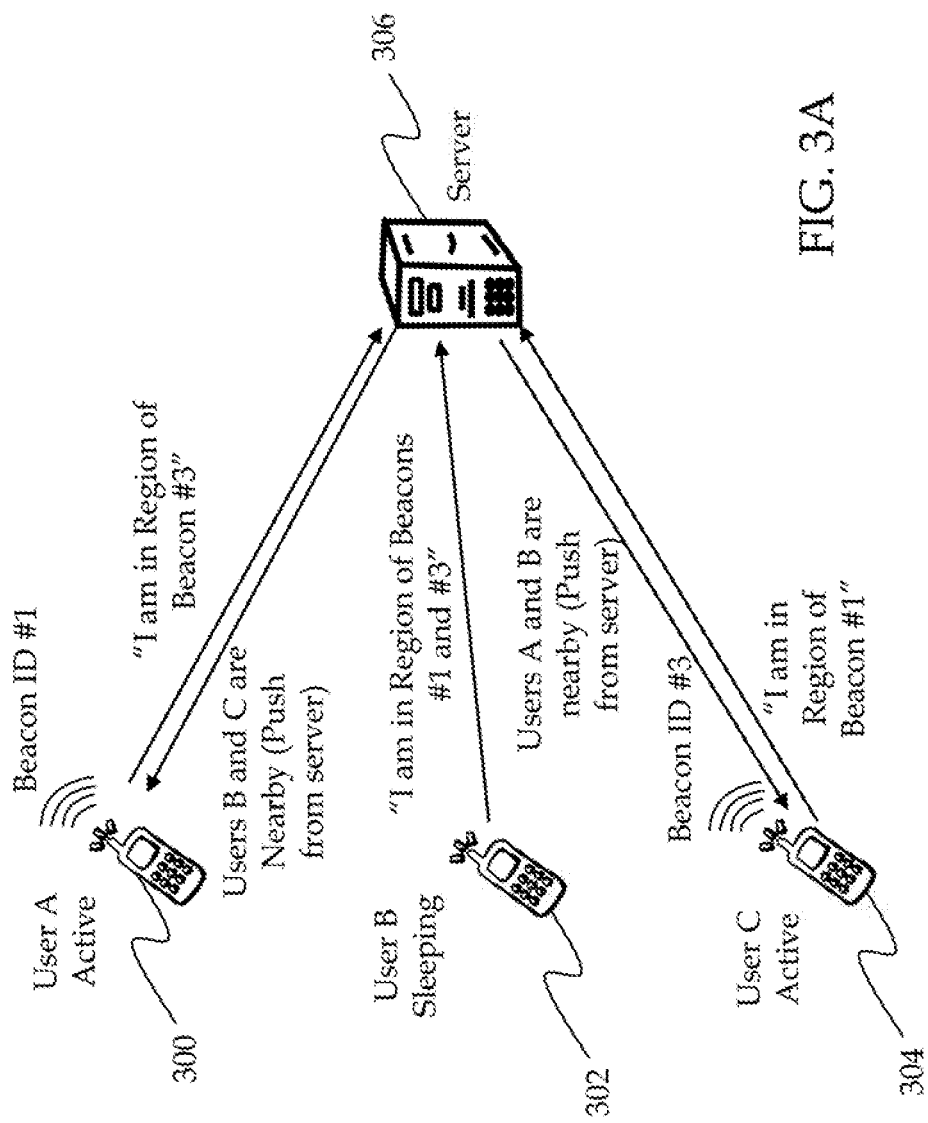

PROXIMITY-BASED CONTENT SHARING SCHEME

BACKGROUND OF THE INVENTION (1) Field of the Invention

The present invention relates to computer networking and more particularly to a proximity-based content sharing scheme for use with mobile computing devices.

(2) Description of Related Art

Over the last decade, social and other networking websites and mobile device applications have become ubiquitous. Most current social networks require users to search for or explicitly invite and connect with other users in a cumbersome manner, and typically require the inviting or connecting user to know something about the other person(s), such as their email address, real name, user name, phone number, etc., or to share an existing third-party connection with the target connection, and add or invite them to one or more of the social networks.

While these traditional networks are useful for connecting people based on some degree of prior knowledge or information about the connecting individuals, it is desirable to provide a social networking mechanism to allow for proximity-based content sharing based on location proximity, without more.

SUMMARY OF THE INVENTION

According to one aspect of the present invention there is provided a method and apparatus for proximity-based content sharing on wireless devices is presented in which a first device having a wireless communication region surrounding the device detects other wireless devices within the region. Communication connections are formed between the wireless devices. In response to a user action data is pushed from the wireless device to other wireless devices in the region. Communication connections can also be formed between devices in the region and devices outside the region and data may be pushed to the devices outside the region. Users can block other devices either within the region or outside the region so that they do not receive pushed data.

BRIEF DESCRIPTION OF THE DRAWINGS

The invention will now be described, by way of example, with reference to the following drawings, in which:

FIG. 3A is an alternative illustration of the connection process between three devices according to the present invention, similar to a portion of FIG. 2A;

DETAILED DESCRIPTION

Figure 1:
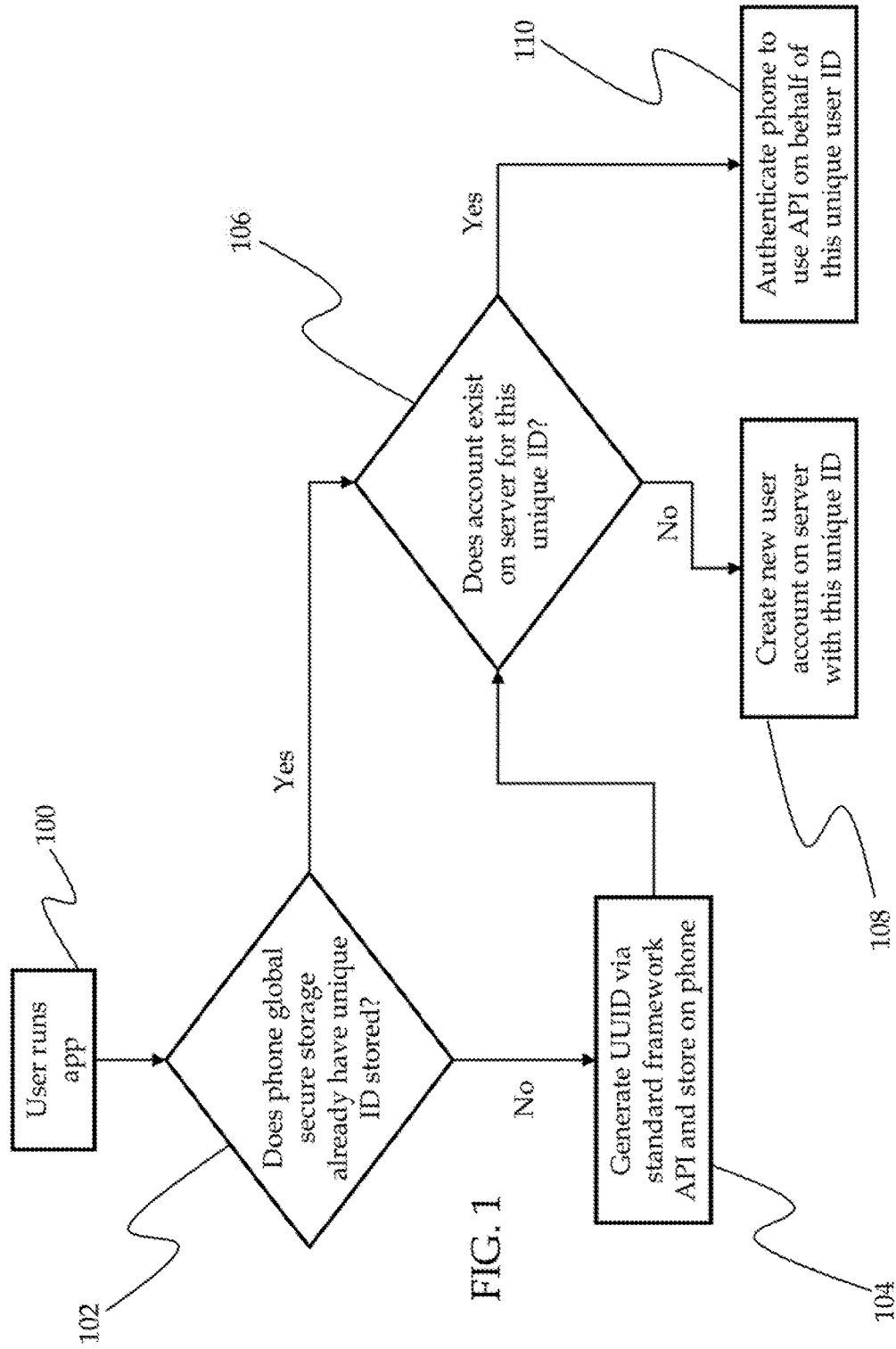
FIG. 1 is a flow chart illustrating an account creation process according to the present invention.

The present invention relates to a proximity-based content sharing scheme. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Further, note that content shared can be of any form, non-limiting examples of which include vibrations (e.g., someone tapping out Morse code or the beat of a song, a heartbeat, walking or running pace, jumping up and down etc.), sounds, video, images, text, or even other sensory experiences such as smells and odors.

Specific Details

The present invention provides a proximity-based content sharing scheme. Typically, the present invention would take the form of an "app" for use on a mobile device such as a smartphone or a tablet or smartwatch. However, the present invention can also be used on non-mobile or semi-mobile devices such as laptop or desktop computers. As a further non-limiting example, the present invention could be used in vehicles. For simplicity, this description will be placed in the context of the invention taking the form of an app for use on smartphones, such as an Apple iPhone operating with iOS or an Android mobile device.

The present invention allows and causes users of the app to seamlessly and automatically establish contact with, connect with, and maintain connections with other users of the app based, typically, on near-range location proximity, without more. This method of forming connections diverges from the more explicit friending/connecting methods of existing networks, although the application will still allow for these more traditional forms of making connections.

A flow chart illustrating an account creation process according to the present invention is depicted in FIG. 1. As can be seen, after downloading and installing the app onto their device, the user then runs the app 100. The app checks the storage area of the device (e.g., KeyChain service on iOS devices) to determine if a Universally Unique Identifier (UUID) or similar identifier generated by the app is already present on the device 102. A pre-existing UUID would generally be present in cases where the app was previously installed and later deleted. If no UUID is present, a server computer creates a UUID for the device, typically through a standard framework Application Program Interface (API) and stores the UUID on the user's device 104. In either case, once a UUID is stored on the user's device, the server computer checks to determine whether an account exists for this particular UUID 106. If no account exists, a new user account is created with the device's UUID 108. Once an account does exist, the device is authenticated to use the API on behalf of the particular UUID 110. Note that once assigned, the UUID remains stored on the user's device even if the app is uninstalled. If the app is re-installed, the stored UUID is used. Also note that a UUID can be blocked; because the UUID is persistent in a particular device, there are no easy workarounds to eliminate blocks.

A non-limiting list of exemplary current near-range location proximity-based technologies that are useful in conjunction with the present invention include iBeacon, Beacon, and Bluetooth. An example article describing how iBeacon functions may be found at http://en.wikipedia.org/wiki/IBeacon, a copy of which is included herein as Appendix A. The present invention uses such near-range location proximity-based methods to detect, identify, establish contact and connect, and share content between users of the app who are nearby, even if such other users have not manually opened or awakened their installed app. In other words, no sign up, no log-in, no phone, email, or text verification, no "friending," no "following," and no "liking" is necessary. If two (or more) devices within a certain proximity of each other have the app installed, content can be shared. For example if app User A takes a photo using their device from within the user interface of the app, the photo will be automatically shared with all other users of the app that are in close proximity to User A's device. Again, photos are a non-limiting example of content that can be shared.

Figure 2A:
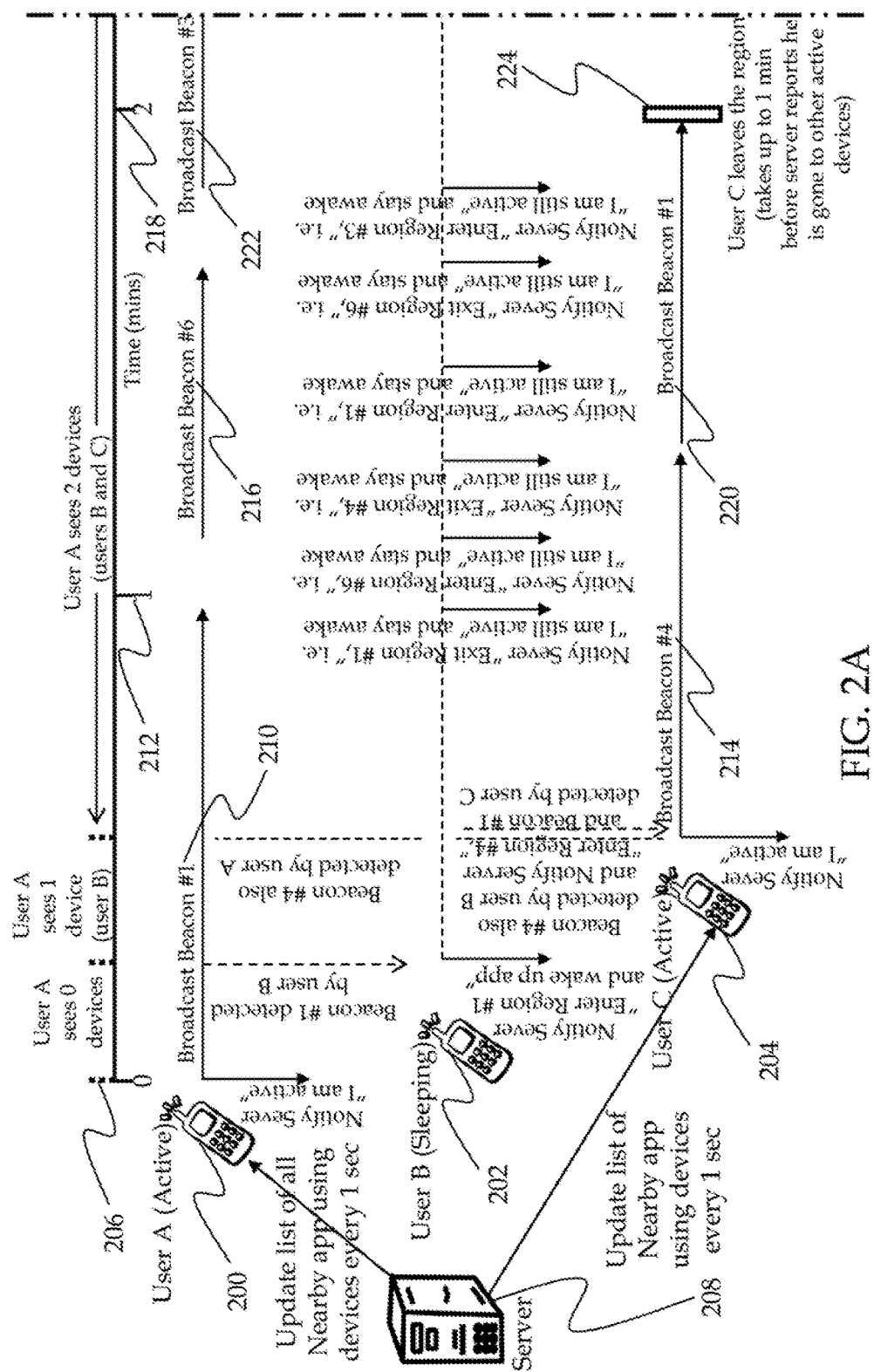
FIG. 2A and FIG. 2B are parts of a schematic diagram illustrating a device detection process according to the present invention, in which multiple beacons are used to ensure the connection of devices within a signal area.
Figure 2B:
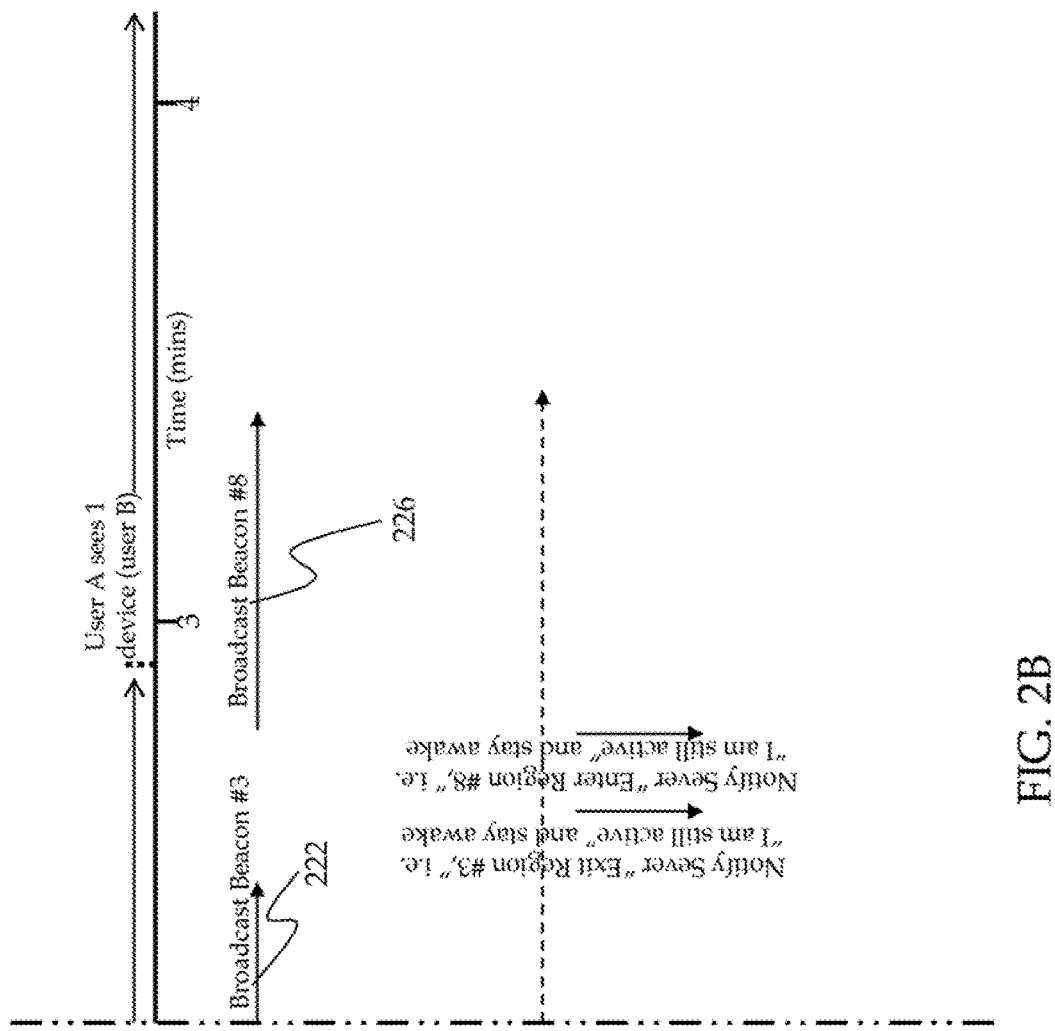

A schematic diagram illustrating a device detection process according to the present invention is presented in FIG. 2, in which multiple beacons are used to ensure the connection of devices within a signal area. Note that FIG. 2 is broken into FIG. 2A and FIG. 2B and that, together, they represent a continuous timeline flowing from the start in FIG. 2A through to FIG. 2B. This figure depicts interaction between three users. It is initially assumed that app User A 200 has the app installed with a valid account and that the app is open, active, and awake. It is further assumed, that app User B 202 has the app installed with a valid account, that the app is asleep (whether closed or open), and that User B is not initially within User A's proximity. Finally, it is assumed, that User C 204 has the app installed with a valid account, that the app is active, and that User C is not local to either User A 200 or User B 202. This is the state at a time=0 (minutes) 206.

For each device using the app, a list is maintained on a server computer 208. This list may be updated periodically, e.g., once per second, or it can be dynamically updated whenever a change occurs. In this discussion, the list is User A's 200. Starting at time=0 206, the device of User A 200 broadcasts beacon #1 210. At some point between time zero and time =1 212, beacon #1 210 is detected by the device of User B 202. The device of User B 202 notifies the server 208 that it has entered region #1 (the area of broadcast beacon #1 201) and the app is executed (woken up).

Also between time=0 206 and time=1 212, the device of User C, which is active and has notified the server 208 of its active state, transmits broadcast beacon #4 214. Broadcast beacon #4 214 is detected by the devices of User A 200 and User B 202. User B notifies the server 208 that it has entered region #4 (the area of broadcast beacon #4 214). At the same time, broadcast beacon #1 is detected by the device of User C 204.

User B 202 remains in region #1 until the device of User A 200 ceases transmitting broadcast beacon #1. At this point, the device of User B notifies the server 208 that it is exiting region #1 and that it is still active and stays awake. The device of User A 200 then begins transmitting broadcast beacon #6 216. The device of User B 202, now in range of broadcast beacon #6 216 notifies the server 208 that it is entering region #6 and that it is still active and stays awake. Next, between time=1 212 an time=2 218, User C 204 ceases transmitting broadcast beacon #4 214. At this point, User B 202 notifies the server that it is exiting region #4 and that it is still active and stays awake. The device of User C 204 then begins transmitting broadcast beacon #1 220. The device of User B 202 notifies the server that it is entering region #1 and that it is still active and stays awake. Next, in the same time frame, the device of User A 200 ceases transmitting broadcast beacon #6 216. At this time, the device of User B 202 notifies the server 208 that it is exiting region #6 and that it is still active and stays awake. The device of User A 200 next begins transmitting broadcast beacon #3 222. The device of User B 202 notifies the server that it is entering region #3 and that it is still active and stays awake. At some point near time=2 218, the device of User C 204 leaves the region, and it may take some time (typically up to a minute) for the server to report that User C 204 is gone with respect to other nearby devices running the app.

Sometime later, as shown in FIG. 2B, the device of User A 200 ceases transmitting broadcast beacon #3 222. At this time, the device of User B 202 notifies the server 208 that it is exiting region #3 and that it is still active and stays awake. The device of User A 200 then begins transmitting broadcast beacon #8 226. The device of User B 202 notifies the server that it is entering region #8 and that it is still active and stays awake.

The above communication scheme with reference to FIG. 2 exemplifies how devices with the app locate and maintain contact in order to be able to transmit content to each other. For clarity, similar communications are shown in FIG. 3A through FIG. 3C, which are described below.

A scenario similar to that of FIG. 2A in the time range from approximately half way between time=0 206 and time=1 212 through to before time=2 218 is shown. Initially, the device of User A 300 is active and is transmitting broadcast beacon #1; the device of User B 302 is sleeping; and the device of User C 304 is active and is transmitting broadcast beacon #3. The device of User A 300 receives beacon #3 and alerts the system server computer 306 that it is in the region of broadcast beacon #3. The device of User B 302 receives beacon #1 and beacon #3 and alerts the server computer 306 that it is in the regions of beacon #1 and #3. The device of User C 304 receives beacon #1 and alerts the server computer 306 that it is in the region of beacon #1. The server computer 306 then pushes out local lists to each of the devices, alerting the device of User A 300 that it is in the region of the devices of User B 302 and User C 304; alerting the device of User B 302 that it is in the region of the devices of User A 300 and User C 304; and alerting the device of User C 304 that it is in the region of the devices of User A 300 and User B 302. Thus the devices are all alerted regarding other devices within their local region proximity.

Figure 3B:
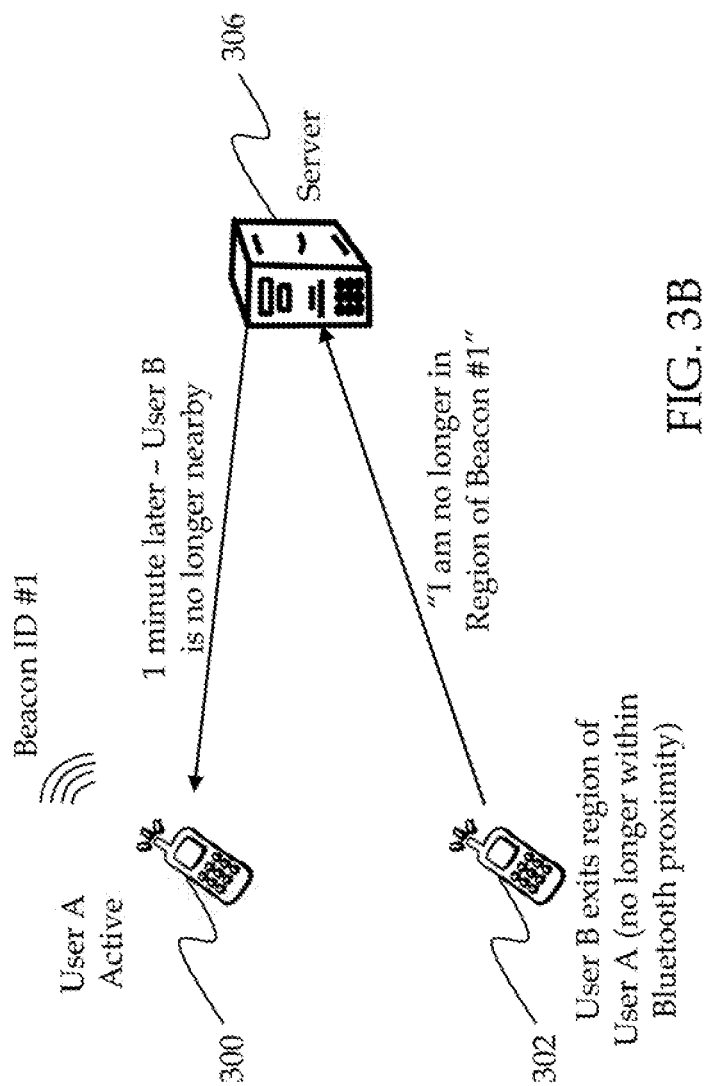
FIG. 3B is an alternative illustration of the process of one device exiting from the proximity of another according to the present invention, similar to a portion of FIG. 2A.
Figure 3C:
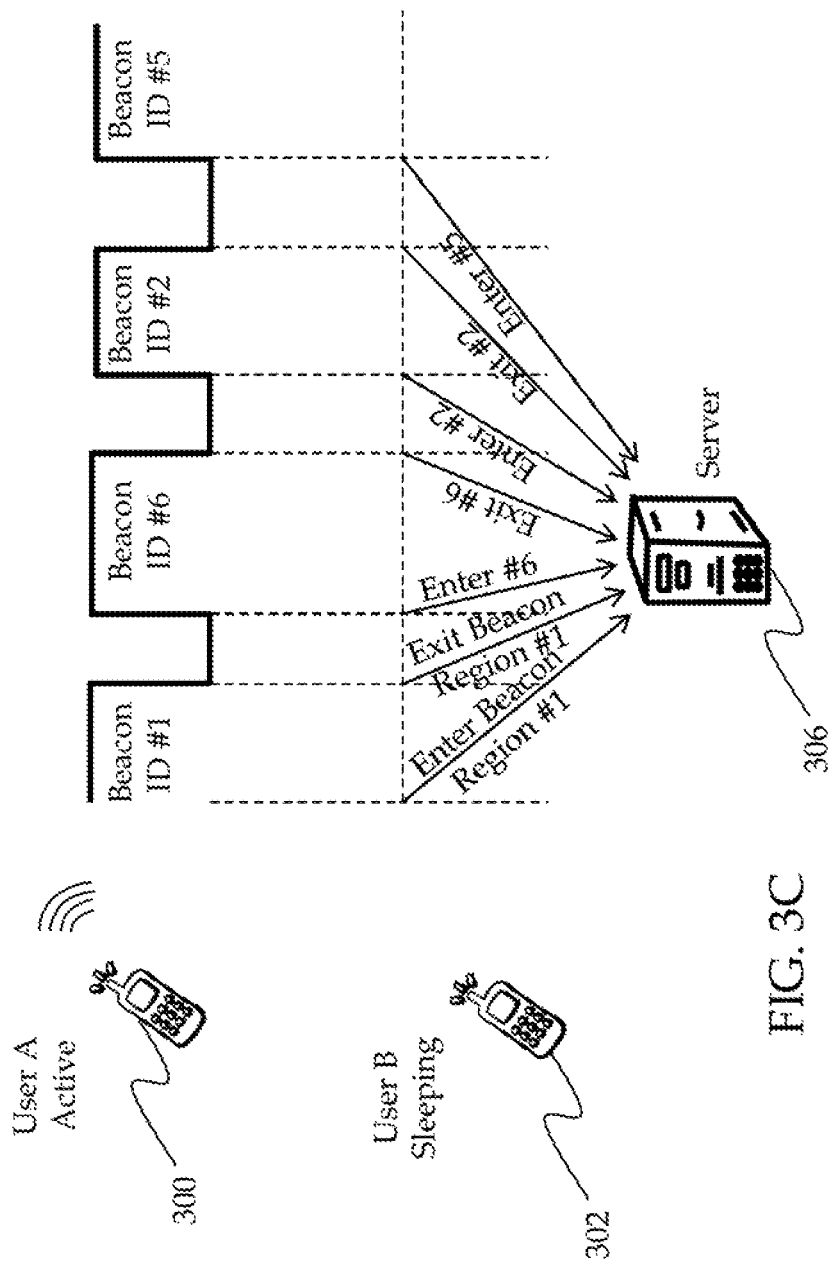
FIG. 3C is an alternative illustration of a device "hopping" between subsequent beacon regions according to the present invention, similar to a portion of FIG. 2A.

A scenario similar to that of FIG. 2A around time=2 218 is shown in FIG. 3B. In this case, a device is exiting the region of another device. In this case, the device of User A 300 is transmitting broadcast beacon #1 and the device of User B 302 is within the region of beacon #1. Subsequently, the device of User B 302 exits the (iBeacon) region of the device of User A 300 (e.g., moves beyond Bluetooth proximity). The device of User B 302 alerts the server computer 306 that it is no longer in the region of beacon #1. Subsequently (typically within a minute), the server computer 306 relays information to the device of User A 300 that the device of User B 302 is no longer nearby. As a result, the app will cease transmitting content from the device of User A 300 to the device of User B 302.

Over time, the beacons with different beacon IDs are transmitted. Typically, the beacons are transmitted for one minute or less and vary somewhat in transmission length. Examples of beacons transmitted by the device of User A 300 are shown in the upper portion of FIG. 3C. In this case, the sequence of beacons transmitted is Beacon ID #1, Beacon ID #6, Beacon ID #2 and Beacon ID #5. As shown in the lower portion of FIG. 3C, as the device of User B 302 subsequently enters and exits each beacon, it informs the server computer 306; thus, it first enters beacon region #1, then exits beacon region #1, then enters beacon region #6, then exits beacon region #6, then enters beacon region #2, then exits beacon region #2, then enters beacon region #5, thus ensuring that the region in which the device of User B 302 is located is continually updated.

Upon establishing a connection between User A, on one hand, and on the other hand User B, User C, User D, etc., the system will automatically add all app users who User A connected with to User A's contact list and the system will also add User A to the contact list of each user who User A connected with. The contact list is a list of other users of the app and is typically stored both locally on the user devices and also on the system's server computer. It is desirable that the contact list is persisted on the server computer even if a user uninstalls and re-installs the app. If Users B, C, and D, for example, have not shared any content with each other, because the system has shared content from User A with those users, the system will automatically add all of those users to each other's contact lists.

The system can also automatically share content with certain of a user's established contacts who are not in range when sharing occurs. This occurs when a friend or contact is added as a "ghost." This feature will be described in detail below.

The app presents a method of displaying to users within range of each other so that users can see who else with active apps is nearby. This feature can show other users regardless of whether content has been shared one-way, two-way, or not at all. An illustration of a screenshot showing such a display mechanism is presented in FIG. 4. A series of "radar" bands 400 can be seen spreading radially outward from a circle 402 that represents the location of the user. The distance and angle of another user 404 from the circle 402 within the bands 400 provides an approximate representation of the distance of the other user 404 from the user. Icons representing another user 404 can provide information regarding the other user 404 such as a picture representation of the user, the status of the other user 404 as an active user local to the user of the device or a "ghost," identifying information regarding the user (e.g., their initials), identifying information regarding the user's device (e.g., the first initial of the user's device's name), etc. In the case shown, the other user 404 is a "ghost" and is represented by an image of the other user 404 surrounded by a "ghost"-shaped perimeter.

Figure 5:
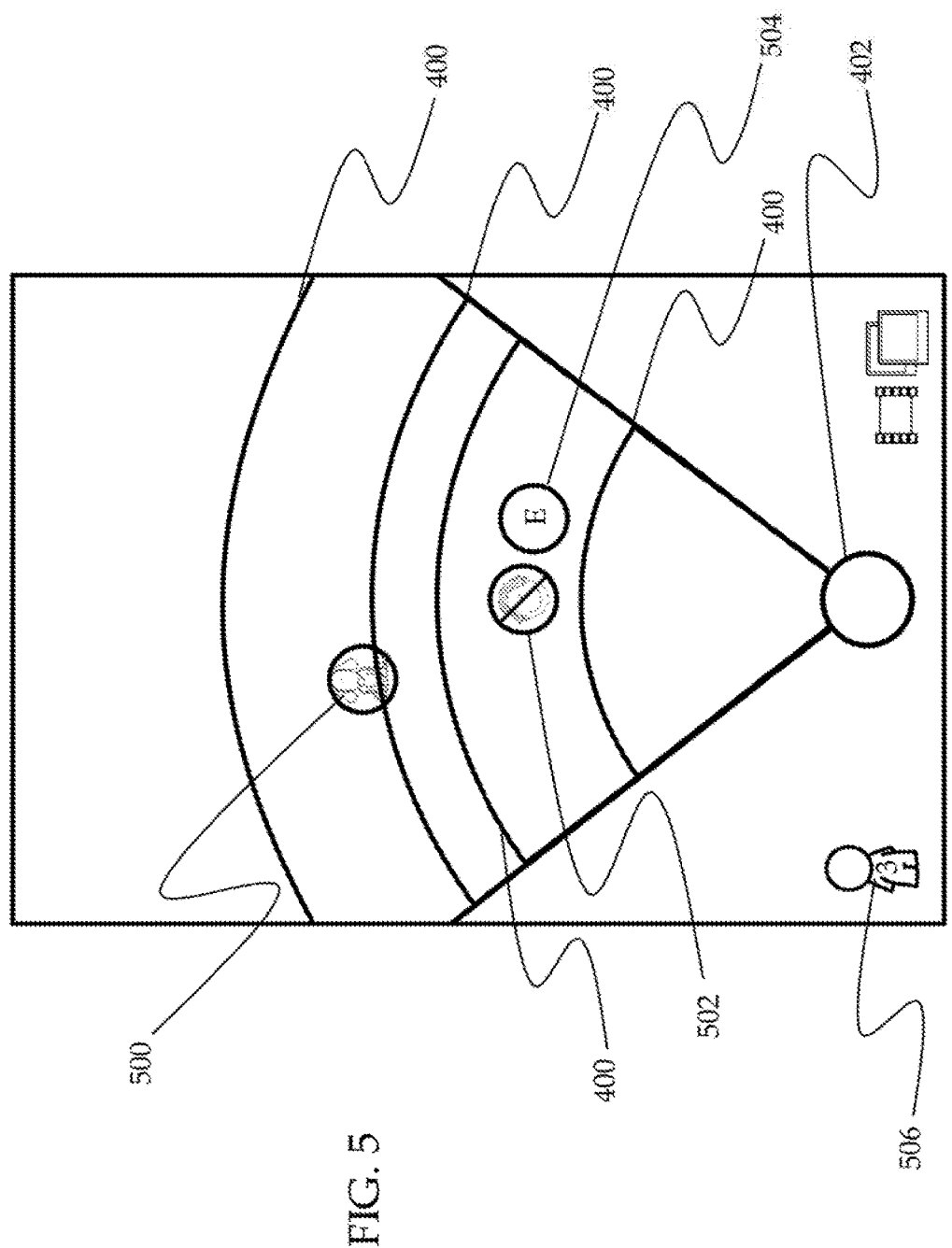
FIG. 5 is an illustration of a radar-type screen on a device showing both connected users and blocked users according to the present invention.

Another illustration of a screenshot is shown in FIG. 5, with three users, 500, 502, and 504, within range of the circle 402 representing the user of the device. In this case, user 502 is blocked from receiving content from the present device, as indicated by the diagonal bar across the icon representing user 502. Also, in the lower left-hand corner, an icon 506 displays the number of other users within range of the device. The location of the other users, 500, 502, and 504, within the radar bands 400 represents the approximate respective distance of the other users, 500, 502, and 504, from the user of the device. Note that in this case, user 502 is blocked.

Figure 4:
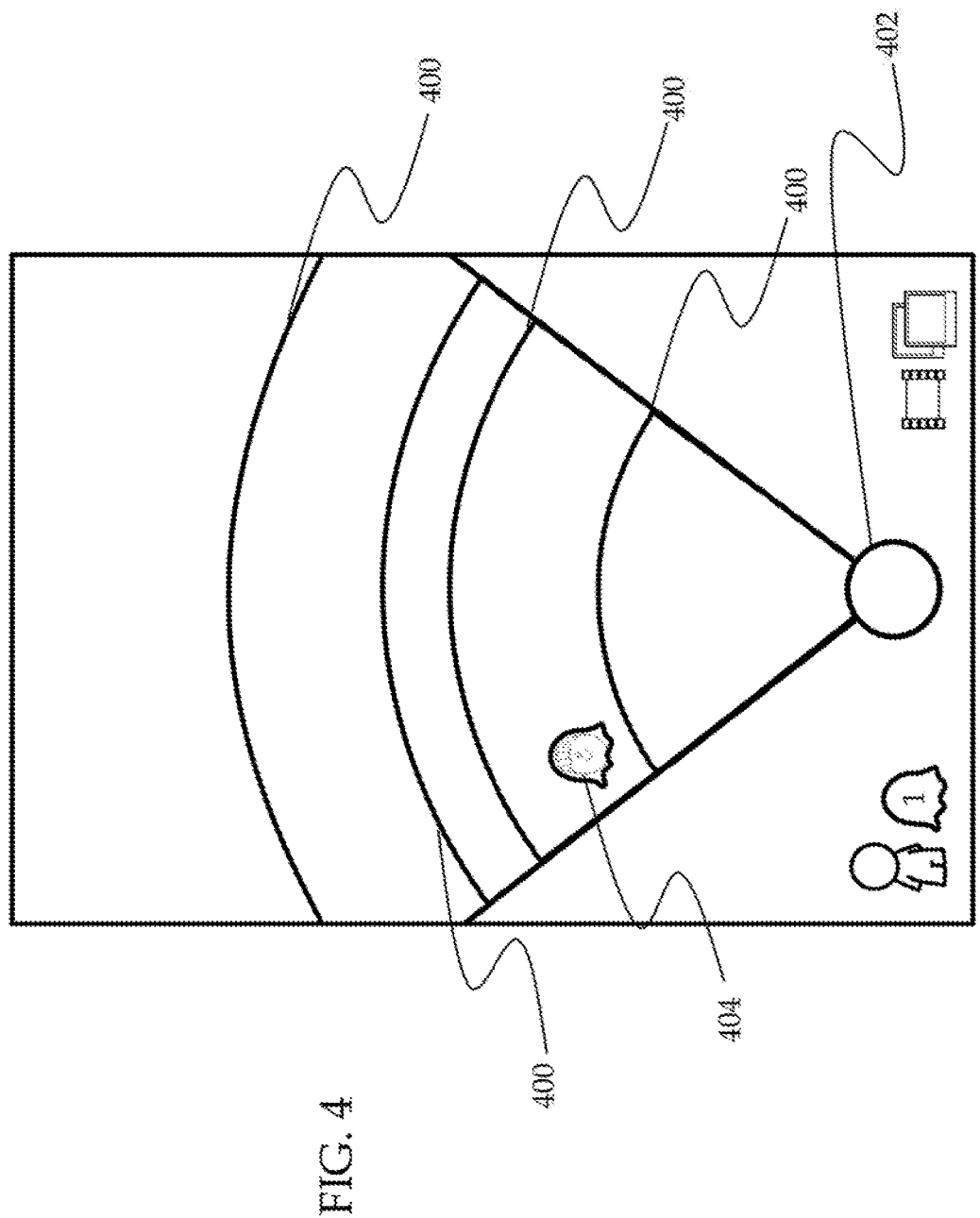
FIG. 4 is an illustration of a radar-type screen on a device according to the present invention, with a "ghost" indicator.
Figure 6:
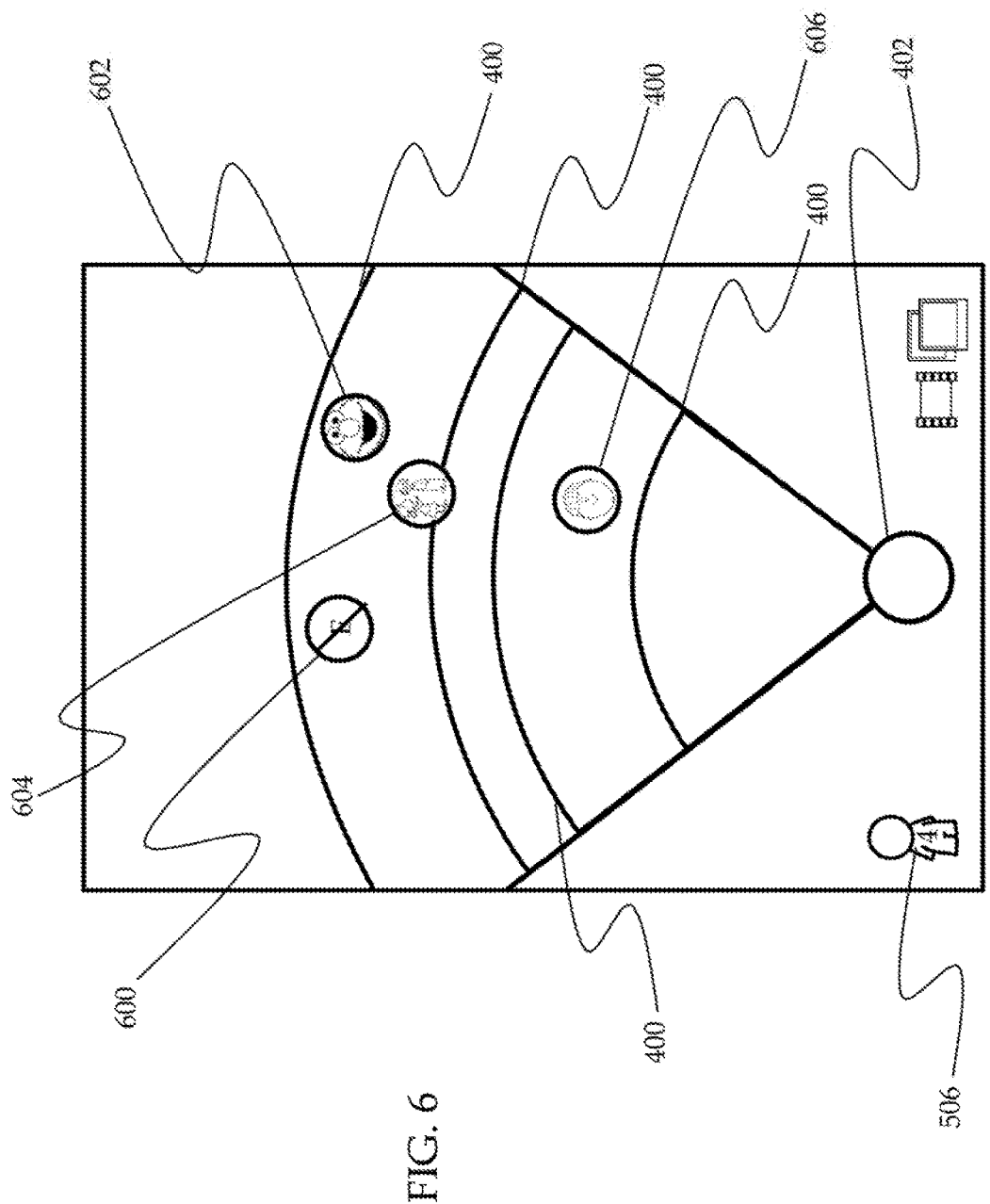
FIG. 6 is another illustration of a radar-type screen on a device showing both connected users and blocked users according to the present invention.
Figure 7:
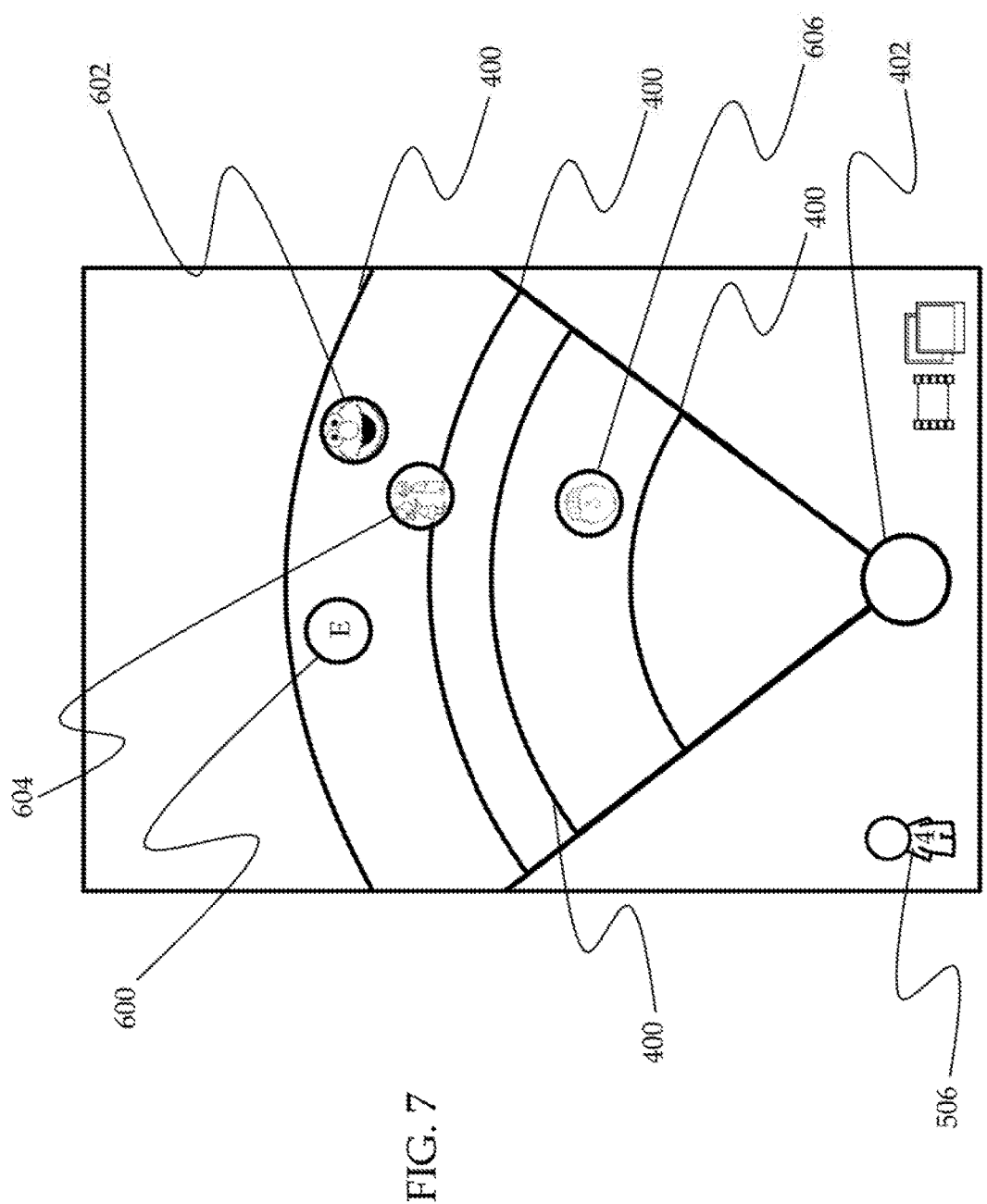
FIG. 7 is an illustration of a radar-type screen on a device showing connected users according to the present invention.

Two other illustrations of screenshots similar to those of FIGS. 4 and 5 are shown in FIGS. 6 and 7. In these illustrations, there are four other users, 600, 602, 604, and 606, the total number of which is represented by icon 506. In FIGS. 6 and 7, user 600 is blocked and unblocked, respectively.

Figure 8:
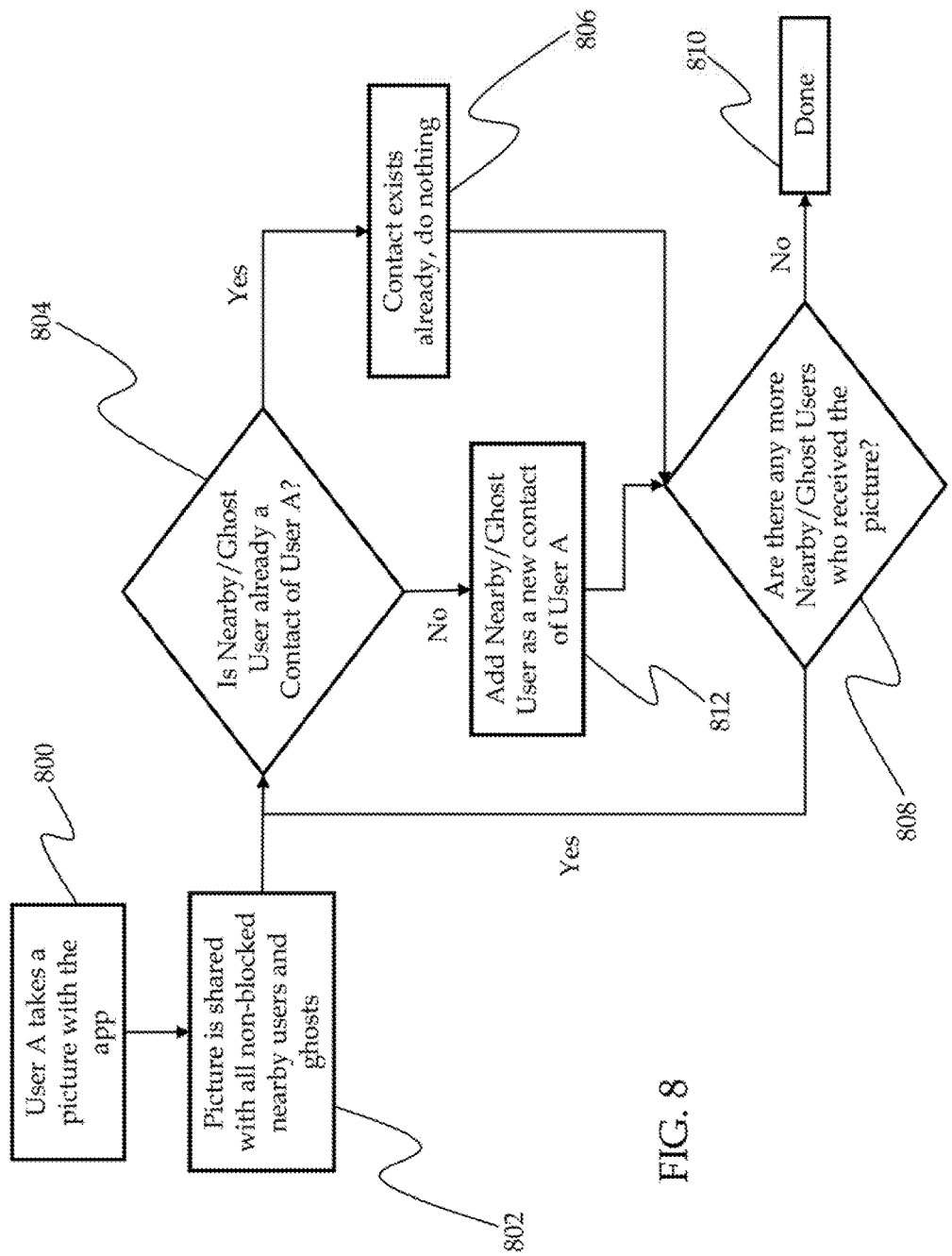
FIG. 8 is a flow chart illustrating a process for creating new connections according to the present invention.

A flow chart illustrating a process for creating new connections according to the present invention is shown in FIG. 8. As shown, User A takes a picture using the app 800. The picture is then shared with all non-blocked local (nearby) users and "ghosts" 802. The system determines whether each other (nearby or "ghost") user is already a contact of User A 804. If the other user is already a contact of User A, then nothing needs to be done 806 and the system determines whether there are any more other users that received the picture 808. If there are none, then the routine for creating new connections ends 810. If there are more other users who received the picture, the routine determines whether the other user is already a contact of User A 804 and continues as shown. On the other hand, if the other user is not already a contact of User A, then the other user is added to the contact list of User A 812 and the routine determines whether there are still other users who received the picture 808 and continues until all other users have been added to the user's contact list.

The present invention enables sharing of content between users who are on each other's contact lists even when those users are not in local range of each other when a share occurs. By going to the contacts screen within the application, there is an option to add that contact as a "ghost." This will virtually add a remote device to experience the same photos that are shared with a User (e.g., User A) and that a User (e.g., User A) shares with other Users (e.g., Users B, C and D). For example, assume that User A and User B are within local range of each other. User A takes a picture from within the app and the system shares the photo from User A with User B, and they are now listed in each other's contact list. User A manually selects the option to add User B as a "ghost" on User A's contact list. Following the addition by User A of User B as a "ghost," thereafter for a (typically) set period of time, when User A and User B are not in local range of each other, when User A shares content from the app, the system will cause that content to be shared with any out of range "ghosts," such as User B, as well as local users of the app. A contact who is added as a "ghost" typically remains a "ghost" for a set period of time and then that contact's "ghost" status expires. The period of time can be set to any desirable length (including having no ending time), and may or may not be user adjustable. To have that same contact become a "ghost" again the sharer must re-add the expired "ghost" device as a "ghost" again. The timed aspect of the "ghost" feature is to allow for contextual and purposeful sharing instead of sharing everything with the "ghost" until the user deselects the "ghost" or the "ghost" blocks the sharing user. For example, if User A goes to an event with contacts of User B, and User A and User B are already each other's contacts within the system, but User B isn't at the event (is not within local range of User A), and while at event party User A adds User B as a "ghost," then for the period of time that User B is User A's "ghost," whenever User A shares or receives content (e.g., photos) those photos will be shared with and among all local app users as well as the "ghosts" of those local app users. Here User B who has been added as a "ghost" of User A will receive all of the photos that User A takes (typically for a set period of time, such as 30 minutes), and User B will also receive the photos of anyone who happens to be nearby User A that is using the app. It is presumed that User B will want to see photos of the event that involves his or her contacts. Further, assume User C is near User A and takes a photo. User C's photo is shared with User A, and User C and User A are added to each other's contact lists. User C and User B (User B is not locally present) were not previously on each other's contact list however, both User A and User B (who is "ghosted in" by User A) receive User C's photo and User B (the "ghost" of User A) and User C can be added to each others contacts lists (typically by an action of the user). In a desirable aspect, one degree of "ghosts" is allowed (though in practice, any desired "degree" "ghosting" is possible). For example, if User A activates (from User A's contact list) non-present User B as a "ghost" (e.g., "ghosts" User B in), then, in addition, all users currently "ghosted" in by User B will also be visible to User A. If content is shared, the users "ghosted" in by User B can also be added to User A's contact list. Active "ghosts" of User C can also be added to the contact list of User A and User A's active "ghosts." However, contacts of User C who are neither nearby nor active "ghosts" are not added to User A's contact list and active "ghosts."

"Ghosts" may also be "pinned" on the screen as favorites. While "pinned," the "ghosts" may still be blocked and unblocked. However, an icon representing the "ghost" will remain on the screen.

Another aspect of the invention is the ability to ignore a contact or connection for a period of time (or indefinitely) so as to temporarily stop receiving photos (and other content) from that user (e.g., temporarily blocking content from a particular user for 30 minutes). A user (e.g., User A) can also block another user (e.g., User B) in a manner that completely removes the other user from the user's contact list. A block typically happens for a pre-determined period of time (e.g., 30 minutes), though it can also be indefinite. Other blocking options include:

1. Always ignore—This removes a user from the blocker's radar forever and never allows them to see the blocker on their radar but leaves the person in the blocker's contacts list so the blocker is able to retract this action. Additionally, this can also remove any content received from the blocked user and remove any content received from them.

2. Delete Forever—This deletes a user from the blocker's contacts hat as well as any content received from that user. Also, the blocked user will never be able to be added back to the blocker's contacts list. The blocked or removed user does not receive notification that the blocking/deleting user has blocked or removed them.

In the case where iBeacon technology is used to locate devices within range, when the app is opened, it immediately starts broadcasting a beacon region, with one of ten unique identifiers (IDs) shared by all apps according to the present invention. Every device with the app will automatically monitor regions regardless of whether the app is active or not. Devices with active apps will randomly stop broadcasting one particular region and start broadcasting a different region periodically (e.g., every 30-60 seconds).

The reasons for this particular behaviour are:

1. Starting/Stopping beacon broadcasting triggers Exit/Enter Region events in monitoring devices with the app. This has the effect of waking up sleeping devices to actively range for beacons again and notify the server they are still nearby the broadcasting device.

2. Multiple beacons are used so that if there are other devices with active apps in close proximity, when User A's device stops broadcasting a beacon it minimizes the chance that there are other devices still broadcasting using the same beacon ID. This, in turn, would prevent devices with sleeping apps from triggering an "Exit Region" event as the region would not have disappeared.

3. Random durations are used for broadcasting/topping/starting beacons to again maximize the chances of Exit/Enter Region events properly triggering when there are multiple devices with the app in close proximity When one app is opened and two or more devices with the app installed are recognized by the system as being within local proximity of each other, the system will create up to ten possible iBeacon regions. Each device monitors all active regions. Active devices randomly select as few as two devices with the app installed and broadcast is randomly switched between them. Since the system randomly selects regions, this increases the probability any single region won't be used by other devices around. Further, this ensures that the system is able to wake a sleeping device that is within the region. When someone opens an app it starts broadcasting an iBeacon signal, all sleeping devices receive an entered region event. The devices detect and get parameters and report this information back to the server. Generally, every 30-60 seconds, the broadcasting device will stop broadcasting its current beacon and start broadcasting another beacon. Devices in range will receive exit and then enter region events.

Figure 9:
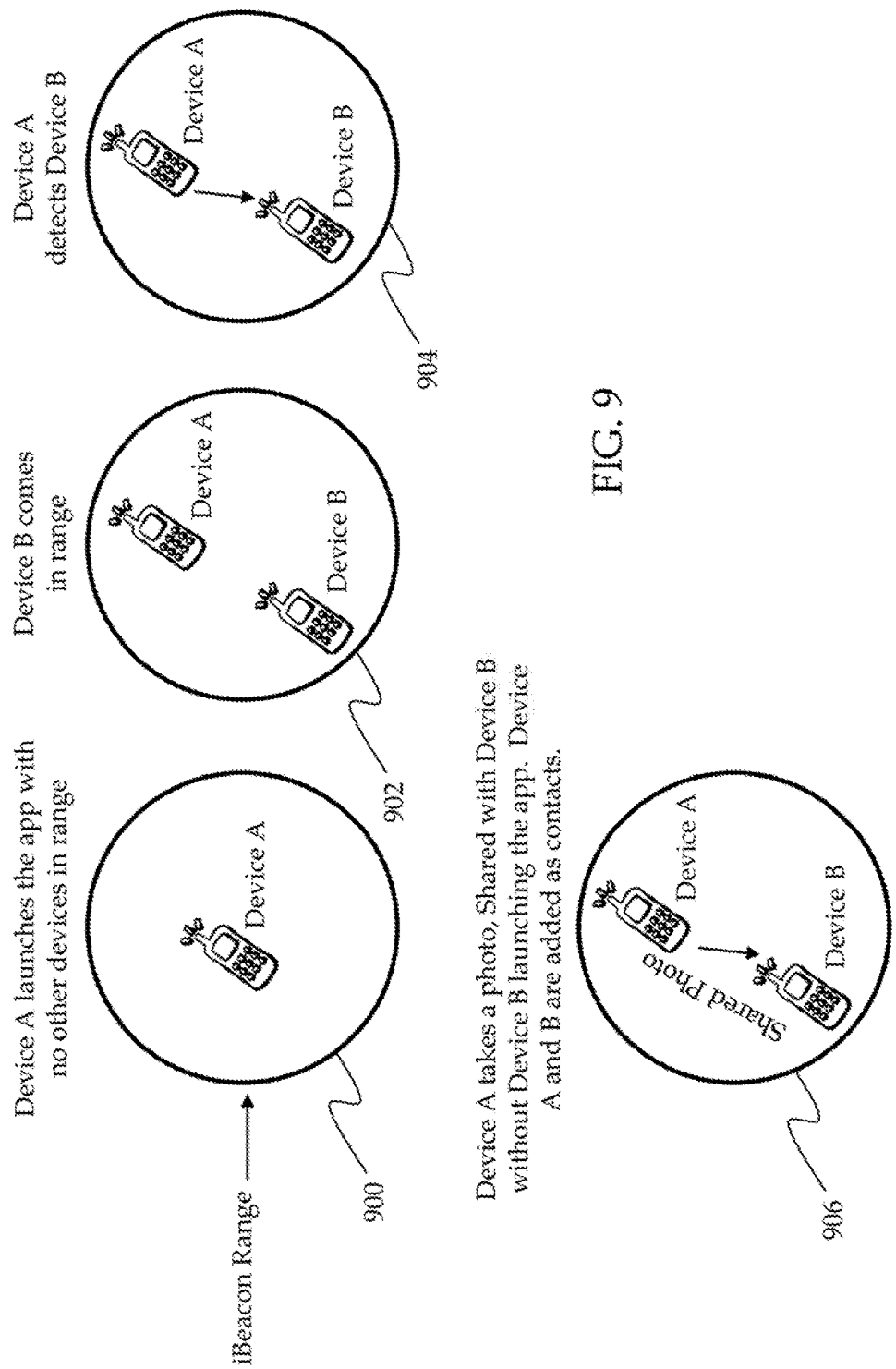
FIG. 9 is an illustrative diagram of two devices entering the local proximity of each other and establishing communication to share content according to the present invention.

For greater understanding of the principles of the invention, a series of devices with halos roughly representing the transmission area of beacons from the devices is presented in FIG. 9. In the first step, the app is launched by device A with no devices in range 900. Subsequently, Device B moves within the transmission (beacon) range of Device B 902 Next, Device A detects Device B 904. Note that non-limiting ways that this detection may be made include directly by Device A monitoring for the presence of device B; it may be made for Device B detecting a beacon of Device A and then Device B alerting Device A that it is within Device A's beacon range; or it may be by Device B detecting a beacon of Device A and then Device B alerting a server computer (not shown) that it is in the presence of Device A and then the server computer notifying Device A of Device B's presence (i.e., through an intermediary). Regardless of the detection mechanism, a connection is made such that Device A can share content (e.g., a photo) with Device B without Device B launching the app and Device A and Device B are added as contacts 906. In some cases, to conserve resources, a lower resolution version of content (e.g., a photo) can be displayed on the device and a higher resolution version can either be stored on the device or available for downloading. The content can be stored remotely on a computer server for some period of time during which it is available for downloading.

Figure 10:
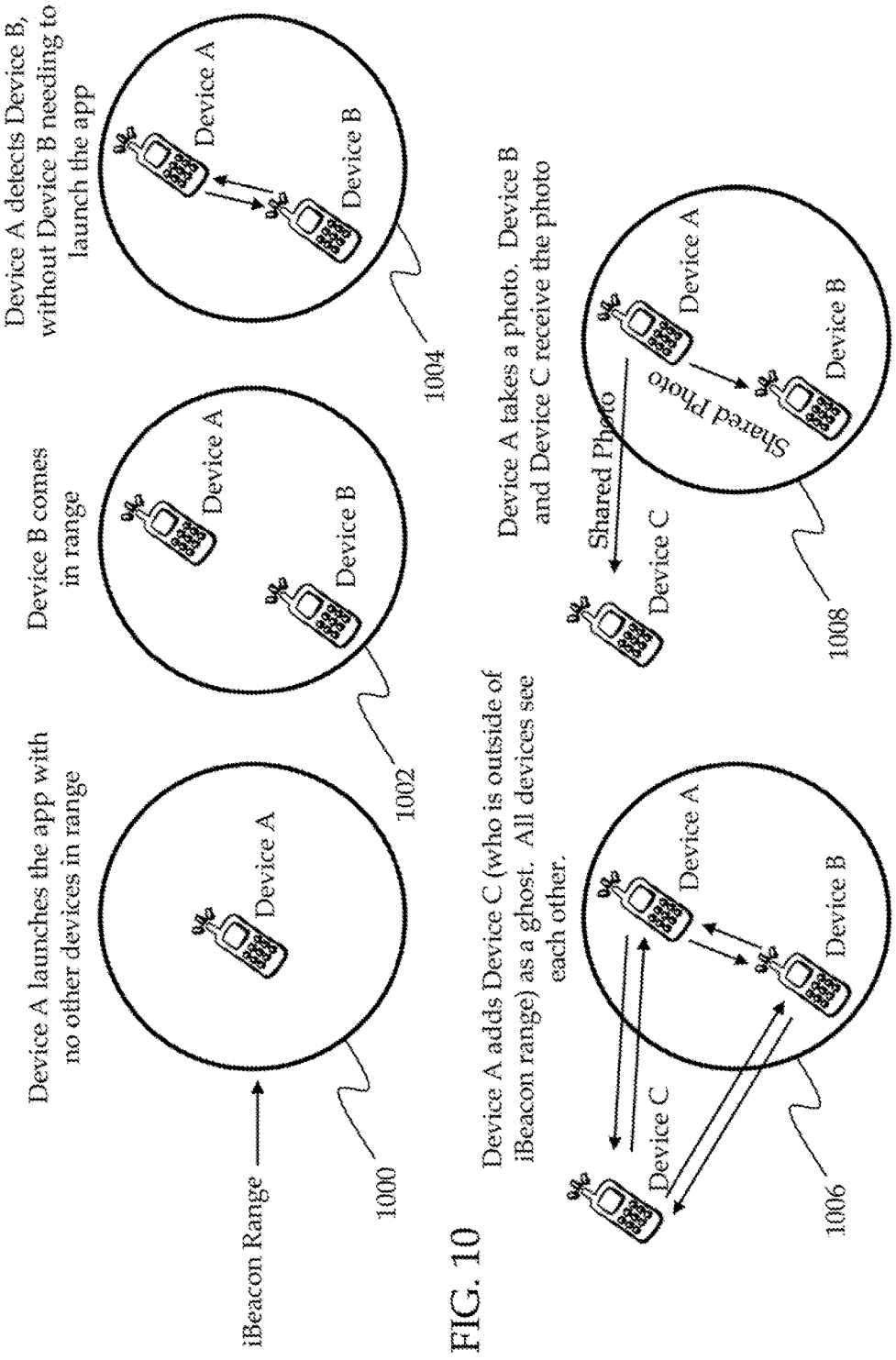
FIG. 10 is an illustrative diagram of two devices entering the local proximity of each other and establishing communication to share content according to the present invention where one device adds a remote device as a "ghost."

The process of connecting with and transmitting content to a "ghost" is shown in FIG. 10. A connection between Device A and Device B similar to that shown in FIG. 9 (elements 900, 902, and 904) is presented by FIG. 10 elements 1000, 1002, and 1004. Next, Device A adds Device C (which is outside of the transmission range of the beacon, as represented by the halo) as a "ghost," and all devices are able to "see" each other 1006. In this case, Device A takes a photo which is then shared with both local Device B and "ghost" Device C 1008.

it will be readily apparent to persons skilled in the relevant art that various modifications and improvements may be made to the foregoing embodiments, in addition to those already described, without departing from the basic inventive concepts of the present invention.

What is claimed is:

1. A method for photo distribution by a first mobile computing device comprising:
   the first mobile computing device, without input from a user of the first mobile computing device, using a near-range location protocol to detect and identify other mobile computing devices which are proximate the first mobile computing device, wherein proximity is determined through the near-range location protocol;
   the first mobile computing device causing creation of a contact list of the identified other mobile computing devices, wherein the contact list is defined based only upon the identified other mobile computing devices being proximate the first mobile computing device through the near-range location protocol; and
   in response to the user of the first mobile computing device taking a first photo using the first mobile computing device, the first mobile computing device automatically pushing the first photo to the identified other mobile computing devices in the contact list for unrestricted access of the first photo by the respective users of the identified other mobile computing devices in the contact list;
   wherein the contact list includes the first mobile computing device, the method further comprising receiving a second photo taken by a second mobile computing device, wherein the second mobile computing device is one of the identified other mobile computing devices in the contact list, and wherein the second mobile computing device automatically pushed the second photo to the contact list;
   wherein each of the mobile computing devices has a status, wherein the status is at least one of sleeping and active, the method further comprising, if the first mobile computing device is sleeping, the first mobile computing device automatically becoming active in response to the second mobile computing device pushing the second photo.

2. The method of claim 1 further comprising:
   the first mobile computing device ceasing to be proximate to at least one of the identified other mobile computing devices, forming a communication connection between the first mobile computing device and the non-proximate identified other mobile computing devices; and
   in response to the user of the first mobile computing device taking a second photo using the first mobile computing device, the first mobile computing device automatically pushing the first photo to the identified other mobile computing devices in the contact list.

3. The method of claim 1 further comprising:
   in response to the user of the first mobile computing device requesting to remove a selected one of the identified other mobile computing devices from the contact list,
   the first mobile computing device causing the selected one of the identified other mobile computing devices to be removed from the contact list.

4. The method of claim 1 the method further comprising, if a second mobile computing device ceases to be proximate the first mobile computing device, wherein the second mobile computing device is one of the identified other mobile computing devices in the contact list, the second mobile computing device is not removed from the contact list.

5. The method of claim 1 the method further comprising, after the contact list is created, a second mobile computing device is automatically added to the contact list without input from the user of the first mobile computing device, using the near-range location protocol to detect and identify the second mobile computing device based only upon the second mobile computing device being proximate the first mobile computing device through the near-range location protocol.

6. The method of claim 1 further comprising the first mobile device automatically communicating with a server which facilitates creation of the contact list.

7. The method of claim 1 further comprising the first mobile device automatically communicating with a server which facilitates pushing the first photo to the contact list.

8. A first mobile computing device configured for sharing photos with other mobile computing devices, the first mobile computing device having non-transitory computer-readable instructions thereon for:
   the first mobile computing device, without input from a user of the first mobile computing device, using a near-range location protocol to detect and identify other mobile computing devices which are proximate the first mobile computing device, wherein proximity is determined through the near-range location protocol;

the first mobile computing device causing creation of a contact list of the identified other mobile computing devices, wherein the contact list is defined based only upon the identified other mobile computing devices being proximate the first mobile computing device; and in response to the user of the first mobile computing device taking a first photo using the first mobile computing device, the first mobile computing device automatically pushing the first photo to the identified other mobile computing devices in the contact list for unrestricted access of the first photo by the respective users of the identified other mobile computing devices in the contact list;

wherein the contact list includes the first mobile computing device, the first computing device further having non-transitory computer-readable instructions thereon for receiving a second photo taken by a second mobile computing device, wherein the second mobile computing device is one of the identified other mobile computing devices in the contact list, and wherein the second mobile computing device automatically pushed the second photo to the contact list;

wherein each of the mobile computing devices has a status, wherein the status is at least one of sleeping and active, wherein the first computing device further having non-transitory computer-readable instructions thereon for, if the first mobile computing device is sleeping, the first mobile computing device automatically becoming active in response to the second mobile computing device pushing the second photo.

9. The first mobile computing device of claim 8 further having non-transitory computer-readable instructions thereon for:

if the first mobile computing device ceasing to be proximate to at least one of the identified other mobile computing devices, forming a communication connection between the first mobile computing device and the non-proximate identified other mobile computing devices; and in response to the user of the first mobile computing device taking a second photo using the first mobile computing device, the first mobile computing device automatically pushing the first photo to the identified other mobile computing devices in the contact list.

10. The first mobile computing device of claim 8 further having non-transitory computer-readable instructions thereon for:

in response to the user of the first mobile computing device requesting to remove a selected one of the identified other mobile computing devices from the contact list, the first mobile computing device causing the selected one of the identified other mobile computing devices to be removed from the contact list.

11. The first mobile computing device of claim 8 further having non-transitory computer-readable instructions thereon for, if a second mobile computing device ceases to be proximate the first mobile computing device, wherein the second mobile computing device is one of the identified other mobile computing devices in the contact list, the second mobile computing device is not removed from the contact list.

12. The first mobile computing device of claim 8 further having non-transitory computer-readable instructions thereon for, after the contact list is created, a second mobile computing device is automatically added to the contact list without input from the user of the first mobile computing device, using the near-range location protocol to detect and identify the second mobile computing device based only upon the second mobile computing device being proximate the first mobile computing device through the near-range location protocol.

13. The first mobile computing device of claim 8 further having non-transitory computer-readable instructions thereon for automatically communicating with a server which facilitates creation of the contact list.

14. The first mobile computing device of claim 8 further having non-transitory computer-readable instructions thereon for automatically communicating with a server which facilitates pushing the first photo to the contact list.

* * * * *